June 18, 1957 J. C. ZERWICK 2,795,979
CHATTERLESS COUNTERSINK CUTTER
Filed July 14, 1954
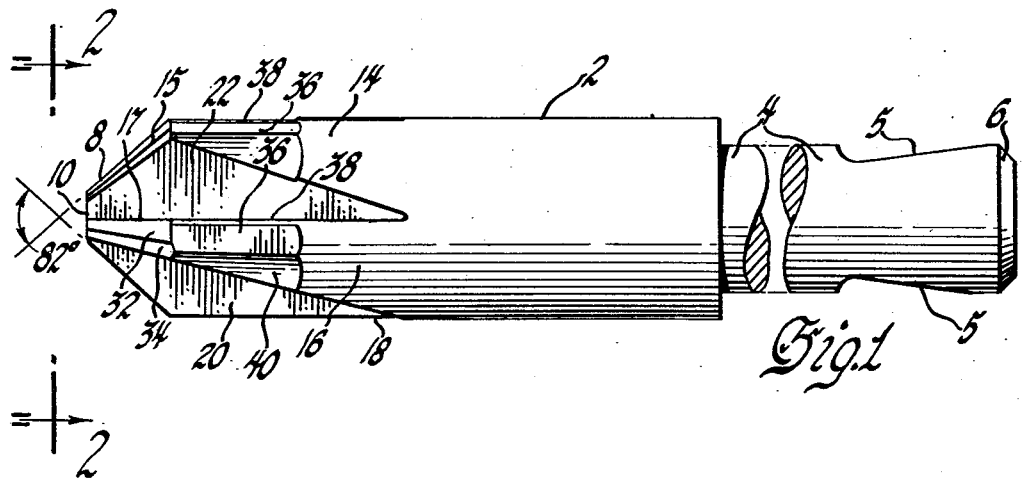
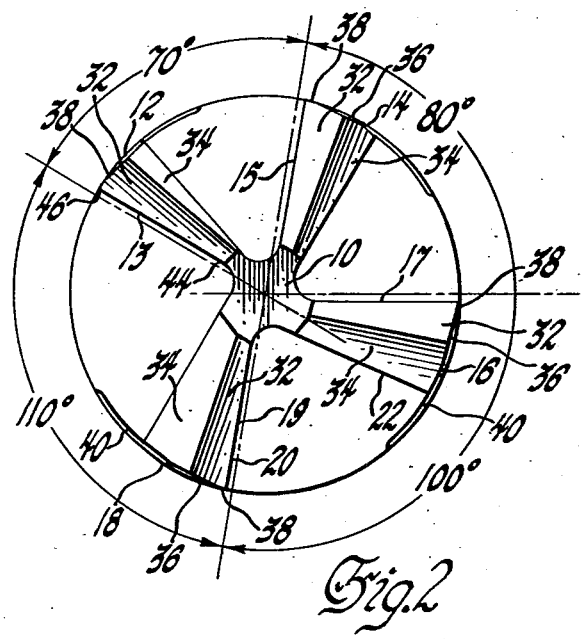
Inventor
John C. Zerwick
By Paul Fitzpatrick
Attorney

2,795,979
CHATTERLESS COUNTERSINK CUTTER

John C. Zerwick, Columbus, Ohio, assignor to General Motors Corporation, Detroit, Mich., a corporation of Delaware Application July 14, 1954, Serial No. 443,335

1 Claim. (Cl. 77—73.5)

This invention relates to improvements in tools and more particularly to countersink cutters used for cutting a chamfered or other enlarged portion in a hole.

Various forms of countersink cutters are well known in the art, but considerable difficulty has been experienced in their use. Many of these cutters are subject to vibration or chattering when run at high speeds, and therefore, have to be run at very low speeds in order to avoid excessive chattering and movement of the cutter relative to the center line of the hole being countersunk.

An object of this invention is to provide a countersink cutter which can be used in high speed operations without chattering and without movement of the cutter relative to the center line of the hole being countersunk. Another object of this invention is to provide a countersink cutter having a number of cutting edges with different included angles between successive cutting edges. A further object of this invention is to provide a countersink cutter having a number of cutting edges with the included angle between successive cutting edges successively decreasing from the greatest angle to the least angle in the direction of rotation of the cutter.

These and other objects of this invention will be readily apparent from the specification and drawings in which:

Figure 1 is a side view of a cutter made in accordance with this invention.

Figure 2 is a view of the cutter of Figure 1 taken on line 2—2 of Figure 1.

The countersink may be made of round tool steel stock of the desired diameter and has a cylindrical body 2 and a reduced shank portion 4 with flats 5 and a chamfered end 6.

The cutting end 8 of the countersink is formed to a conical frustum having an included angle of 82 degrees and a flat end surface 10 having a diameter approximately 3/16 that of the tool steel stock.

The cutting end of the countersink has four flutes 12, 14, 16, and 18 with cutting edges 13, 15, 17, and 19, respectively. The flutes are defined by milled slots and the bases of these slots taper outwardly from the cutting end of the tool at an angle of approximately 14 degrees to the longitudinal axis of the cutter. Each flute has a cutting face 20 and a trailing face 22. The cutting faces 20 are offset from and parallel to planes passing through the longitudinal axis of the countersink. In the example illustrated, which is 3/4 of an inch in diameter, this offset is preferably .010 of an inch.

The planes to which the cutting faces are parallel to and offset from are unequally spaced with respect to each other. Thus, cutting edges 13, 15, 17, and 19 will also be unequally spaced with respect to each other with the angle between edges 13 and 15 being 70 degrees; the angle between edges 15 and 17 being 80 degrees; the angle between edges 17 and 19 being 100 degrees; and the angle between edges 19 and 13 being 110 degrees. As can be seen in Figure 2, the milled grooves between the flutes will be of different angular extent so that each of the flutes will be of approximately the same thickness.

A back off or clearance of 7 degrees is provided in the area 32 adjacent the cutting edges 13, 15, 17, and 19 and a further back off or clearance of 14 degrees is provided at the portion 34 of the flutes adjacent the trailing edge faces 22.

A relief 36 of 7 degrees is provided on each flute adjacent the narrow cylindrical lands 38. This land is preferably .010 inch wide. A further relief 40 is formed on the flutes so that the flutes are below the established diameter except for the narrow lands 38.

The cutter will rotate counterclockwise as viewed in Figure 2 and thus each flute will be inclined forwardly in the direction of rotation of the cutter. Each cutting edge has an inner end 44 adjacent the longitudinal axis of the cutter and an outer end 46 adjacent the intersection of the cutting edge and the circular land. The inner end 44 of each cutting edge will be disposed behind a plane passing through the longitudinal axis of the cutter and the outer end 46 of each cutting edge. Thus, all of the inner ends 44 of the cutting edges will be inclined rearwardly and all of the outer ends 46 of each cutting edge will be inclined forwardly relative to the direction of rotation of the cutter.

It has been found in operation that this countersink cutter may be operated at high speeds without chattering and without movement of the cutter relative to the center line of the hole being countersunk. Each cutting edge will cut at the same angle as the preceding cutting edge but no rhythm of chattering will be set up since each cutting edge will cut at a different point than the preceding cutting edge. The countersunk hole will be very smooth since each cutting edge cuts at a different point than the preceding cutting edge.

Although the cutter has been shown and described as having four cutting edges, various numbers of other cutting edges may also be formed within the scope of this invention as long as the included angle between successive cutting edges is successively different and successively decreases from the greatest angle to the least angle in the direction of rotation of the cutter.

While a specific embodiment of this invention has been shown and described, various changes and modifications may be made within the scope and spirit of the invention without departing from it.

I claim:

A rotary countersink cutter comprising, a cutter body having a conical end including a number of unequally spaced flutes, each of said flutes having a cutting face terminating in a cutting edge, each of said cutting faces and said cutting edges lying in a plane generally parallel to and offset from a plane containing the axis of rotation of the cutter and leading said cutting faces and said cutting edges with respect to the direction of rotation of the cutter, each of said spaced cutting edges being separated from an adjacent cutting edge by an included angle, the included angles successively decreasing from the greatest angle to the least angle in the direction of rotation of the cutter, and the inner ends of all said cutting edges being inclined rearwardly relative to the direction of rotation of the cutter and the outer ends of all said cutting edges being inclined forwardly relative to the direction of rotation of the cutter.

References Cited in the file of this patent
UNITED STATES PATENTS

| | | |
|---|---|---|
| 1,049,124 | Merriam | Dec. 31, 1912 |
| 2,383,854 | Gwinn et al. | Aug. 28, 1945 |
| 2,576,664 | Berlien | Nov. 27, 1951 |

FOREIGN PATENTS

| | | |
|---|---|---|
| 563,402 | Great Britain | Aug. 11, 1944 |